United States Patent
Shapiro et al.

(10) Patent No.: US 11,042,423 B2
(45) Date of Patent: Jun. 22, 2021

(54) NON-DISRUPTIVE EXPLICIT FEEDBACK SYSTEM

(71) Applicant: SAP SE, Walldorf (DE)

(72) Inventors: Vladimir Shapiro, Sinsheim (DE); Roman Rommel, Neustadt an der Weinstrasse (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/030,000

(22) Filed: Jul. 9, 2018

(65) Prior Publication Data

US 2020/0012542 A1    Jan. 9, 2020

(51) Int. Cl.
*G06F 9/54* (2006.01)
*G06Q 10/06* (2012.01)
*G06F 9/451* (2018.01)
*G06F 3/0482* (2013.01)

(52) U.S. Cl.
CPC .............. *G06F 9/542* (2013.01); *G06F 9/451* (2018.02); *G06Q 10/0633* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 10,414,408 | B1* | 9/2019 | Fields | B60W 40/09 |
| 2008/0092060 | A1* | 4/2008 | Berg | G06F 16/958 |
| | | | | 715/748 |
| 2014/0157147 | A1* | 6/2014 | Yang | G06Q 30/0281 |
| | | | | 715/751 |
| 2016/0240019 | A1* | 8/2016 | Tamp | G07C 5/0825 |
| 2017/0094636 | A1* | 3/2017 | Fadell | G06F 3/0412 |
| 2017/0269976 | A1* | 9/2017 | Venkataraman | G06F 9/54 |
| 2018/0321667 | A1* | 11/2018 | Celia | G05B 23/024 |
| 2018/0335936 | A1* | 11/2018 | Missig | G06F 21/32 |

* cited by examiner

*Primary Examiner* — Charles E Anya
(74) *Attorney, Agent, or Firm* — Sterne, Kessler, Goldstein & Fox P.L.L.C

(57) ABSTRACT

Disclosed herein are system, method, and computer program product embodiments for obtaining feedback in an explicit, non-disruptive manner. An embodiment operates by determining a trigger corresponding to a feedback event, where the trigger is associated with a particular application that is registered with a feedback application associated with the feedback event; detecting an application event corresponding to the trigger occurs during an execution of the particular application; receiving a screenshot of a user interface of the particular application at a time of the detecting; providing a notification indicating that feedback corresponding to the application event is requested; receiving a request to launch the feedback event; and receiving feedback corresponding to the feedback event via the feedback application.

14 Claims, 5 Drawing Sheets

NON-DISRUPTIVE EXPLICIT FEEDBACK SYSTEM

BACKGROUND

Obtaining user feedback is an important part of the machine learning cycles. Users can provide valuable feedback on a wide range of issues including what is working, what is not working, and why they performed certain actions. Based on the received user feedback, machine learning can be improved.

However, one of the problems with obtaining feedback is that feedback systems often interrupt a user while the user is using a particular application. Additionally, soliciting feedback while the user is in the middle of a task can consume additional processing power and computing cycles that may hurt the performance of the underlying application. This interruptive type of feedback operation can degrade a user's experience with the application, degrade the performance of the underlying hardware, and degrade the quality of the feedback.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for obtaining feedback in an explicit, non-disruptive manner.

There are two types of feedback that are often obtained from users of a particular software system, device, or product. Implicit feedback is often observational feedback. Implicit feedback may be obtained simply by watching or recording a user's actions or interactions with regards to a device or system. For explicit feedback, by contrast, the system asks the user to provide specific information about their actions or interactions.

For example, implicit feedback may be documenting that the user requested data X at time Y. Explicit feedback may be requesting information from the user as to why data X was requested, how satisfied the user was with the responsiveness of the system, or requesting user comments on the functionality of the system. While implicit feedback may be obtained or generated without user interaction, explicit feedback often requires interrupting a user's workflow and degrades the user's experience with a particular device or software system.

Figure 1A:
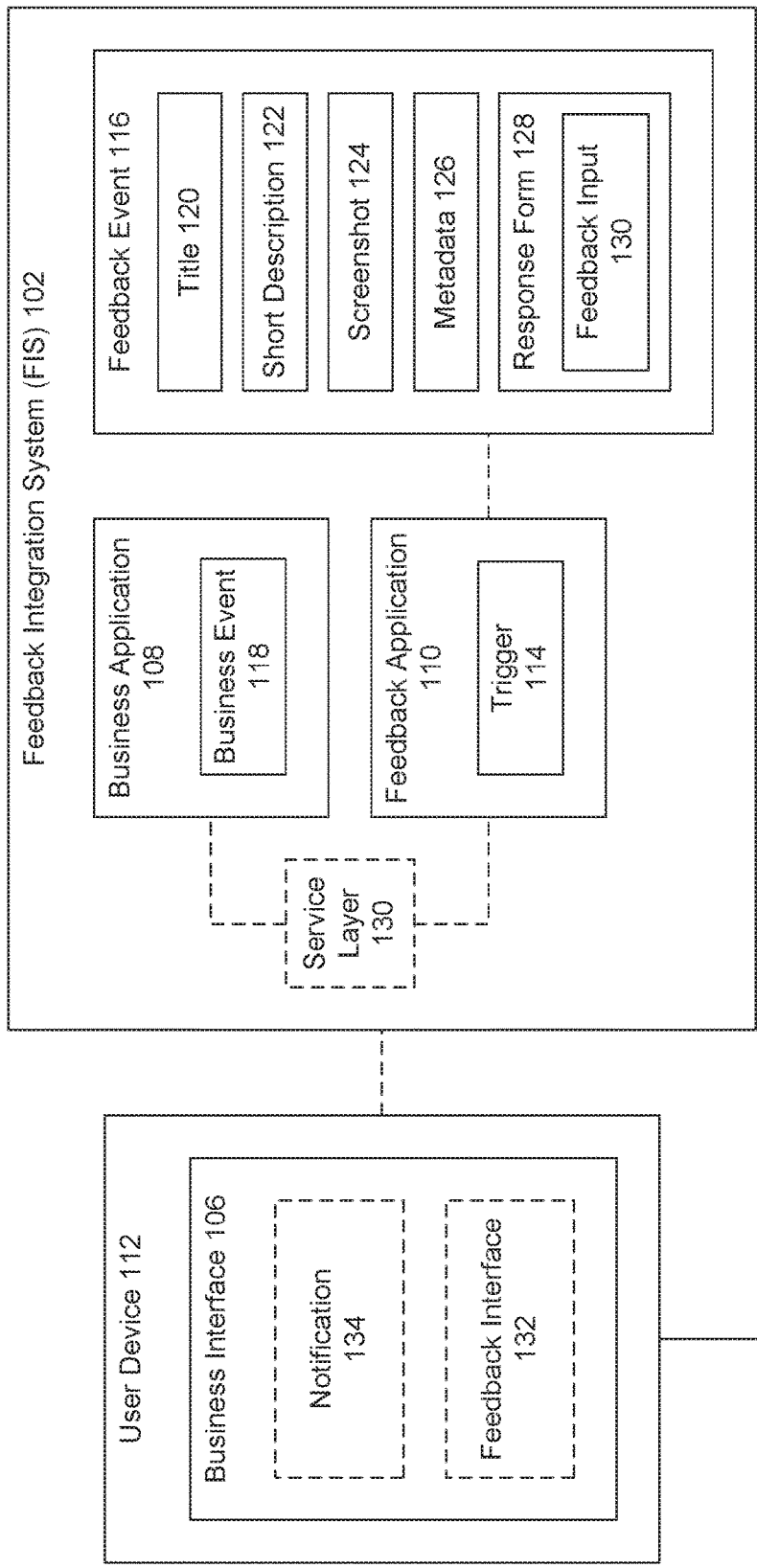
FIG. 1A is a block diagram illustrating a feedback integration system (FIS), according to some embodiments.

FIG. 1A is a block diagram 100 illustrating a feedback integration system (FIS) 102, according to some embodiments. Rather than interrupting a user 104 to request feedback about an action performed by user 104, FIS 102 detects whether a particular event about which feedback is desired has occurred. FIS 102 captures a system state at or around the time of the feedback event, notifies the user that feedback is requested, and enables the user 104 to provide feedback input 130 at a later time that is convenient to the user 104.

When the user 104 later begins the process of providing feedback input 130, FIS 102 may provide the system state or context around the feedback event via a feedback interface 132. The context information about the feedback event may include screenshots, descriptions, metadata, time and date, or other information that may provide user 104 with context surrounding the event. Providing this context information, designed to remind the user about the events, may enable user 104 to provide more accurate and complete feedback input 130 at the time when feedback is being provided.

FIS 102 not only improves the user 104 experience with a business application 108, but also improves processing by consuming fewer resources than may otherwise be required by an interruptive feedback system. For example, rather than starting a new feedback application while the resources of a user device 112 are being used by business interface 106 or business application 108, FIS 102 may wait until user 104 reaches a preferred stopping point. At the stopping point, the once consumed resources may be freed and reallocated to executing feedback application 110 or feedback interface 132 without degrading the performance of the underlying business application 108. In an embodiment, user 104 may provide feedback input 130 after a current session of business application 108 has ended.

In an embodiment, by capturing the context of the business application 108, including business interface 106, at the time of a business event 118, FIS 102 enables user 104 to provide feedback input 130 at a later time. As such, user device 112 may continue allocating resources to executing and processing business interface 106 without de-allocating some of those resources to launching and executing a separate or integrated feedback application.

Business application 108 may include any program or application, including web-application that may be used to perform non-feedback related activities. In an embodiment, business application 108 may include a class of software, apps (cloud, local, or network based), or web applications that benefit from machine learning or a machine-learning driven algorithm that may use or integrate user feedback as described herein. Example business applications 108 may include decision support systems, ranking systems, recommendation systems, monitoring systems, and analytical software systems. Other example business applications 108 may include word processing, spreadsheet, presentation, webpages, online or computer games, or other applications.

Business application 108 may include a business interface 106 through which user 104 interacts with business application 108. Business interface 106 may include any front-end application, or user interface component through which user 104 may receive and/or request data or particular actions to be performed. Business interface 106 may be a client program, desktop application, native application, mobile application, or other interactive display. In an embodiment, business application 108 may include a program that is executing on one or more enterprise servers and is receiving and processing requests, including data updates, from multiple business interfaces 106 across a plurality of user devices 112.

Business events 118 may be any action that may be taken by user 104 via business interface 106, such as requesting or submitting data. In an embodiment, an administrator or other user may define a trigger 114 that corresponds to one or more business events 118. Trigger 114 may indicate a feedback event about which feedback input 130 is to be requested. Example triggers 114/business events 118 may include, but are not limited to, button clicks, entering or requesting value information, submitting or saving information, menu selections, unexpected value entries, query or data requests, etc. In an embodiment, a trigger 114 may correspond to a business event 118, but not every business event 118 may correspond to a trigger 114.

In an embodiment, trigger 114 may be detected when user 104 has entered a particular value in one of the fields of business interface 106, and a different value was expected. In such an embodiment, feedback event 116 may inquire as to what was the rationale behind the entered particular value. In other embodiments, trigger 114 may correspond to any manipulation of the user interface of business interface 106, including marking, flagging flatting, rating, or ranking data.

In an embodiment, FIS 102 may generate a feedback event 116 for a particular trigger 114. Feedback event 116 may be an object that is created upon the detection or occurrence of a business event 118 corresponding to a trigger 114. In an embodiment, a service layer or processor 130 may monitor requests received from business interface 106 to determine whether or not a trigger 114 has occurred.

For example, a save or data request by user 104 entered into user device 112 may be received by service layer 130 prior to being received by business application 108. Service layer 130 may compare the received business event 118 against a set of one or more known or defined triggers 114 corresponding to business application 108. If no trigger 114 is detected, the business event 118 or request may be passed to business application 108 for processing.

However, if a trigger 114 is detected, both business application 108 and feedback application 110 may be notified of the business event 118. In an embodiment, upon receiving an event or trigger notification, feedback application 110 may create a feedback event object 116 and may capture or request context information about business application 108 regarding the business event 118. Example context information may include capturing one or more screenshots 124 and metadata information 126.

In an embodiment, feedback event 116 may include different types of data, some of which may be preconfigured or defined by an administrator before a trigger 114 has been detected (e.g., title 120, short description 122, response form 128), some of which may be captured during a runtime of business application 108 at or around the time trigger 114 is detected (e.g., screenshot 124 and metadata 126), and some of which may be received from user 104 whenever the user provides feedback about trigger 114 (e.g., feedback input 130).

Title 120 may include an administrator-defined or otherwise predefined title of the feedback event 116. An example title 120 may be "Process payment selection." Short description 122 may be a short description that includes key facts or links pertaining to feedback event 116. An example context 122 may be "Payment selection from a user based in the USA" and may include links to the products selected by the particular user 104 from whom feedback is being requested.

In an embodiment, short description 122 may include administrator-defined and/or run-time captured information. For example, short-description 122 may include a plain language description of the trigger event 114. Or, for example, short-description 122 may include a date/time of when the trigger 114 was detected, which may only be determined at run-time.

Screenshot 124 may include one or more screenshots taken by business application 108 or a web browser executing business interface 106. For example, when a trigger 114 is detected, service layer 130 may request user device 112, business application 108, or a web browser (for web applications) to take a screenshot of business interface 106.

In an embodiment, an already executed application or program on user device 112 (e.g., such as business interface 106, browser, business application 108) may take or capture one or more screenshots 124 when trigger 114 is detected, rather than launching feedback application 110. Requesting an already-existing program or using built-in or native functionality of user device 112 to capture a screenshot 124 may consume fewer processing resources on user device 112 than would otherwise be necessary if feedback application 110 was specifically launched to captures screenshots 124. In an embodiment, service layer 130 may receive screenshot 124 from the capturing application, and provide screenshot 124 to feedback application 110 for storage as part of the corresponding feedback event 116.

In an embodiment, at a time when trigger 114 is detected, service layer 130 may request metadata 126 about the state of business application 108 and/or business interface 106. Metadata 126 may include any information or data that is not a screenshot. Metadata 126 may include a username, value information about any of the fields displayed on business interface 106, the name of an executing process of business application 108, or other technical or business-type information.

Figure 1B:
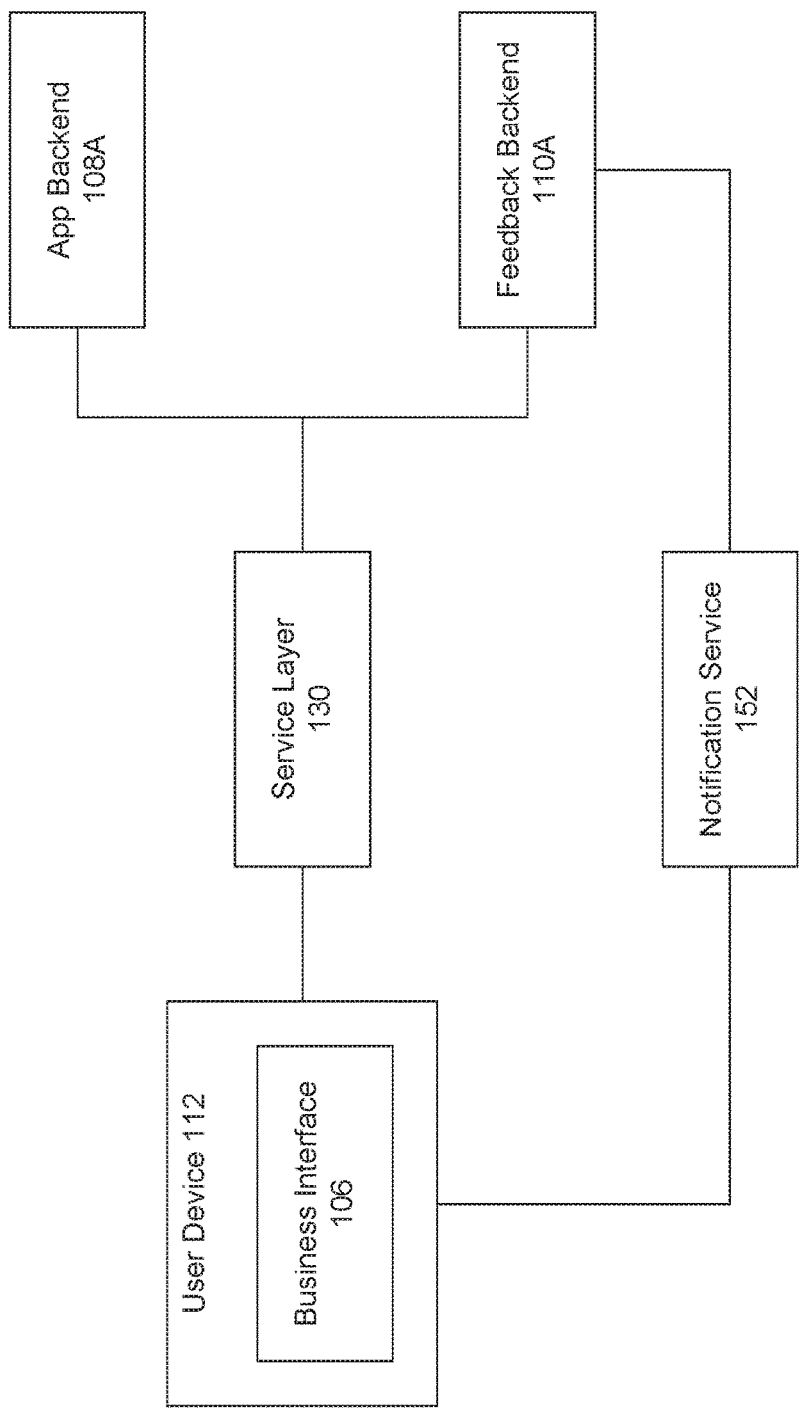
FIG. 1B illustrates an example service-type architecture of a feedback integration system (FIS), according to some embodiments.

As described above, service layer 130 may manage the interactions between business application 108 and feedback application 110. FIG. 1B illustrates an example service-type architecture of a feedback integration system (FIS) 150, according to some example embodiments. In an embodiment, the FIS 150 may be implemented in a cloud-based computing environment.

In an embodiment, service layer 130 may include a processor or set of servers that act as an intermediary between user device 112 and an application backend 108A and a feedback backend 110A (each of which may be operating on their processors). For example, when a user performs an action or submits a request 154 via business interface 106, the request may be received by service layer 130 from user device 112.

Service layer 130 may determine whether request 154 corresponds to a previously defined trigger 114 for the business application backend 108A (e.g., business application). In an embodiment, an arrangement of FIS as a service layer architecture 150 may enable feedback backend 110A to serve or support multiple different business applications or application backends 108A simultaneously.

For example, different business applications may have their own set of triggers 114 which may be detected by one or more service layers 130. Service layer 130 may manage data requests 154 received about multiple different business applications 108 (from different business interfaces 106).

Service layer 130 may determine whether the request 154 corresponds to the previously defined trigger for the corresponding application.

In an embodiment, a service layer 130 may be designated to receive requests 154 for a particular application backend 108A. In another embodiment, service layer 130 may be configured to process requests 154 for different application backends 108A. Service layer 130 may then forward request 154 to application backend 108A and/or feedback backend 110A based on whether request 154 corresponds to a trigger 114.

If the user action, business event 118, or request 154 corresponds to a trigger 114, then screenshot 124, context 122, and/or metadata 126 about a state of business interface 106 and/or business application 108 may be captured. Service layer 130 may receive this captured run-time information and provide it to the handling feedback backend 110A. In an embodiment, a particular feedback backend 110A may be designated to handle feedback events 116 for a particular app backend 108A. In another embodiment, a feedback backend 110A may operate across a plurality of machines or servers and manage feedback events 116 across multiple different app backends 108A for multiple or different business applications 108.

In an embodiment, FIS service-type architecture 150 may enable the operations of application backend 108A (e.g., business application 108) to continue unimpeded or uninterrupted even if feedback backend 110A is not operating. For example, if feedback backend 110A is being updated or the machines of feedback backend 110A have crashed or are unresponsive, service layer 130 may temporarily disable checking whether triggers 114 are being detected while feedback backend 110A is not operative. Similarly, feedback backend 110A may continue operations, in that a user may provide feedback input 130 even if the servers of app backend 108A are not operative.

Upon receiving a trigger notification, feedback backend 110A may create a feedback event 116. As described above, rather than requesting or requiring user 104 to immediately provide feedback input 130, FIS 102 may capture a system state or context at a time when a trigger 114 was detected, and allow the user 104 to provide feedback input 130 at a time when it is more convenient for user 104 or when greater processing resources are available for providing the feedback.

In an embodiment, service layer 130 or feedback backed 110A may signal a notification service 152 when a trigger event is detected. Notification service 152 may be functionality of or operative with user device 112 that may provide visual or audio notifications via user device 112. In an embodiment, notification service 152 may provide a temporary notification 134 in business interface 106 that feedback event 116 has been generated or that a trigger 114 has been detected.

Returning to FIG. 1A, a notification 134 may be provided to user device 112 to be displayed on or with business interface 106. Notification 134 may indicate that a trigger 114 has been detected and that feedback input 130 is being requested responsive to a business event 118 or action that has just occurred. Notification 134 may include a temporary pop-up on user device 112 that indicates a feedback event 116 has been generated or is otherwise available for user 104 to provide feedback input 130.

In an embodiment, notification 134 may include some of the information from feedback event 116. For example, notification 134 may include title 120 or short description 122. Notification 134 may include an indication that a screenshot 124 has been captured. In an embodiment, a user 104 may select or click on notification 134 at any time to provide feedback input 130.

In an embodiment, notification 134 may include an icon or menu selection that is available to user 104 via business interface 106 that indicates that one or more outstanding feedback events 116 have been created for which feedback input 130 is requested. In an embodiment, user 104 may select notification 134 to provide feedback at any time after notification 134 has been provided.

In an embodiment, notification 134 may be provided to user (via notification server 152) through any number of different channels including via user device 112, business interface 106, e-mail, SMS, phone call, or other communication channels. In an embodiment, notification 134 may be provided when the user 104 is ending a current business application 108 session. For example, when a user selects a quit menu option or requests to load a new webpage or program, notification 134 may be provided to request feedback input 130 prior to the business interface 106 terminating.

In an embodiment, a feedback interface 132 may be rendered on user device 112 responsive to a user request to provide feedback input 130 (e.g., such as by the selection of notification 134). Feedback interface 132 may include a display of the information or data of feedback event 116. Feedback interface 132 may include a response form 128 in which the user may provide different types of feedback using radio buttons, free text, voice, audio, video, file attachments, or other input types of input. This input may be received by feedback application 110 as feedback input 130 and stored with feedback event 116.

In other embodiments, feedback event 116 may include other fields such as priority settings and expiration dates and times on feedback events 116. In an embodiment, a particular feedback event 116 may be assigned a particular number of points. As the expiration time gets closer, the number of points assigned to user 104 for responding to the feedback event 116 may decrease. In an embodiment, notification 134 may provide notifications that the point value for a particular feedback event 116 has or is about to decrease, and may include a countdown timer to expiration or the next reduction in point values.

Figures 2A, 2B:
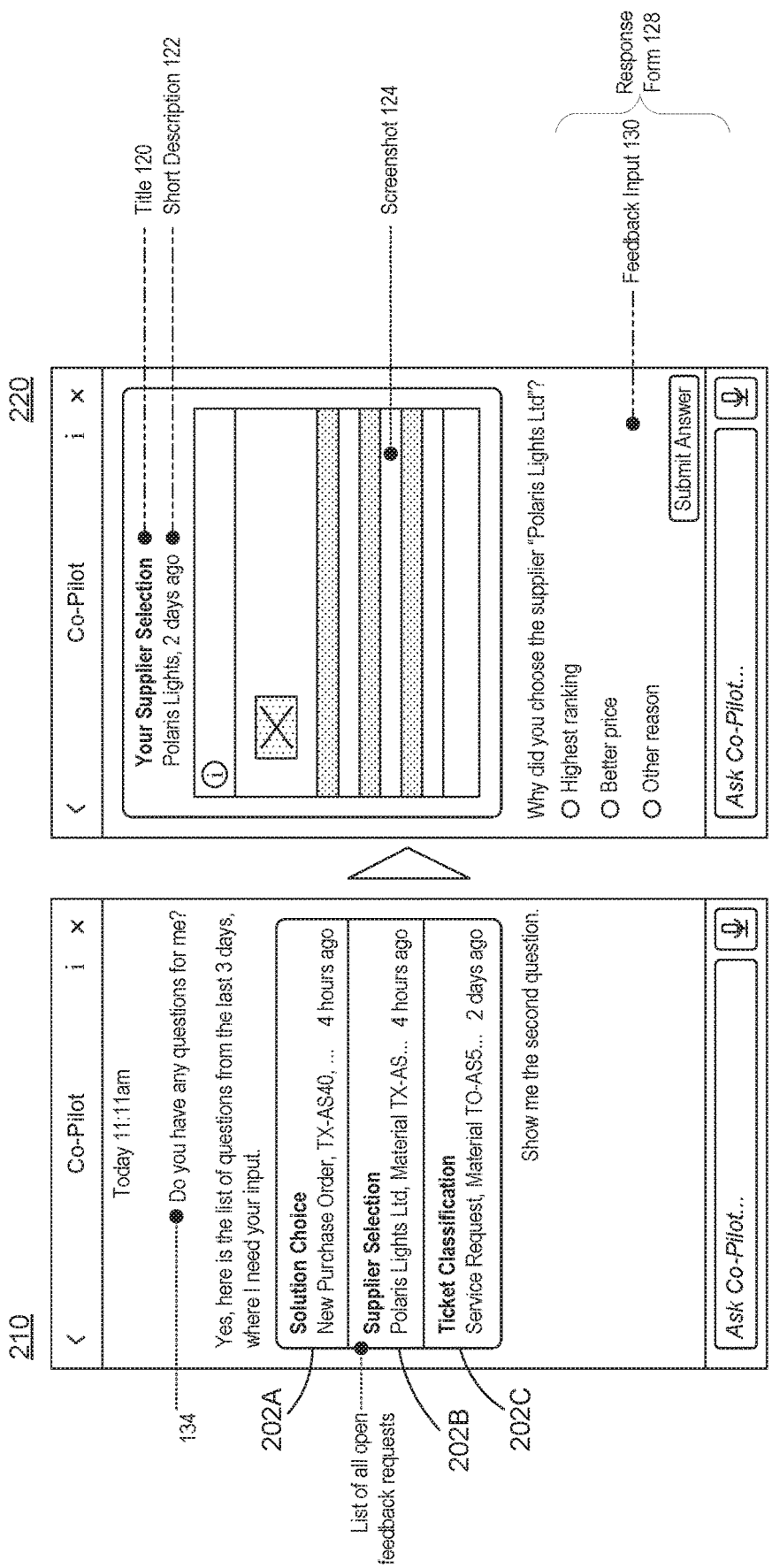
FIG. 2A illustrates an example feedback selection interface, according to some example embodiments.
FIG. 2B illustrates an example of a feedback input interface, according to some example embodiments.

FIG. 2A illustrates an example feedback selection interface 210, according to an embodiment. Feedback selection interface 210 may include a list of various feedback events 202A-C that have been generated responsive to triggers 114 for a particular business application 108. In an embodiment, user 104 may request to view the feedback events 202 from business interface 106. For example, user 104 may select notification 134. This request 154 may be received by service layer 130 and be provided to feedback application 110. In an embodiment, selection interface 210 may provide or display a list of outstanding feedback events to which the user has not yet responded.

Feedback application 110 may then provide feedback selection interface 210 to user device 112. User 104 may then select which feedback event 202 the user 104 is interested in viewing. In an embodiment, user 104 may select any feedback event 202 regardless of the order in which it was generated or whether or not the user 104 has provided responses to previous feedback events 202. FIS may provide greater flexibility for user 104 to choose to which feedback events 202 the user 104 wants to respond, and in which order. User 104 may choose to respond to some feedback events 202, while ignoring or declining others.

FIG. 2B illustrates an example of a feedback input interface 220, according to an embodiment. As illustrated in feedback input interface 210, user device 112 may display the various information of feedback event 116. The feedback interface 210 may include a title 120, a short description 122, one or more displayed or scrollable screenshots 124, and a feedback response form 128.

User 104 may select which question(s) in the response form 128 to which to provide feedback. After selecting the submit button, FIS 102 may receive the information as feedback input 130 at service layer 130 which may provide feedback input 130 to feedback application 110. In another embodiment, feedback input 130 may be received directly by feedback application 110 or feedback backed 110A without first passing through service layer 130.

Figure 3:
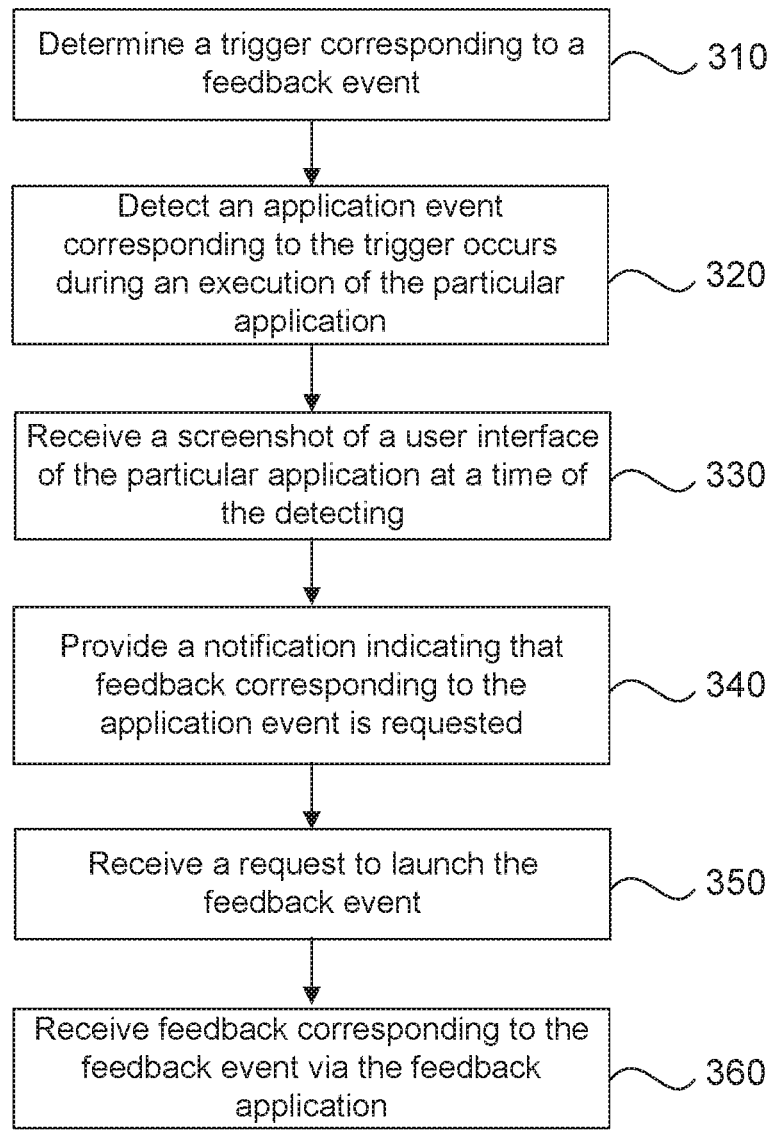
FIG. 3 is a flowchart illustrating example operations of a non-disruptive explicit feedback system, according to some embodiments.

FIG. 3 is a flowchart 300 illustrating example operations of a non-disruptive explicit feedback system, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1A and 1B. However, method 300 is not limited to the example embodiments.

In 310, a trigger corresponding to a feedback event is determined. In an embodiment, an administrator may register the triggers 114 corresponding to a business event 118 with service layer 130 and indicate to which business application(s) 108 the trigger 114 corresponds. In an embodiment, a single trigger 114 (such as a save command) may be registered with multiple business application 108.

In 320, an application event corresponding to the trigger occurs is detected during an execution of the particular application. For example, service layer 130 may receive a request 154 from user device 112. Service layer 130 may compare the request 154 against a set of triggers 114 corresponding to an underlying or associated business application 108 or application backend 108A. Service layer 130 may provide a notification that a particular trigger 114 has been detected to feedback application 110 or feedback backend 110A.

In 330, a screenshot of a user interface of the particular application is received at a time of the detecting. For example, feedback application 110 may receive one or more screenshots 124 and/or metadata 126 for storage with feedback event 116 corresponding to the detected trigger 114.

In 340, a notification indicating that feedback corresponding to the application event is requested is provided. For example, upon creating a feedback event 116, feedback backend 110A may signal a notification service 152 to provide a notification 134 to user 104. In an embodiment, notification 134 may be provided as a visual or audio notification via business interface 106. In another embodiment, notification 134 may include an e-mail notification or other notification that is provided outside of business application 108 or business interface 106.

In 350, a request to launch the feedback event is requested. For example, service layer 130 may receive a request 154 to provide feedback. Service layer 130 may provide request 154 to feedback backend 110A, which may signal user device 112 to display a feedback interface 132.

In 360, feedback corresponding to the feedback event is received via the feedback application. For example, feedback application 110 may receive feedback input 130 for feedback event 116 via feedback interface 132.

Figure 4:
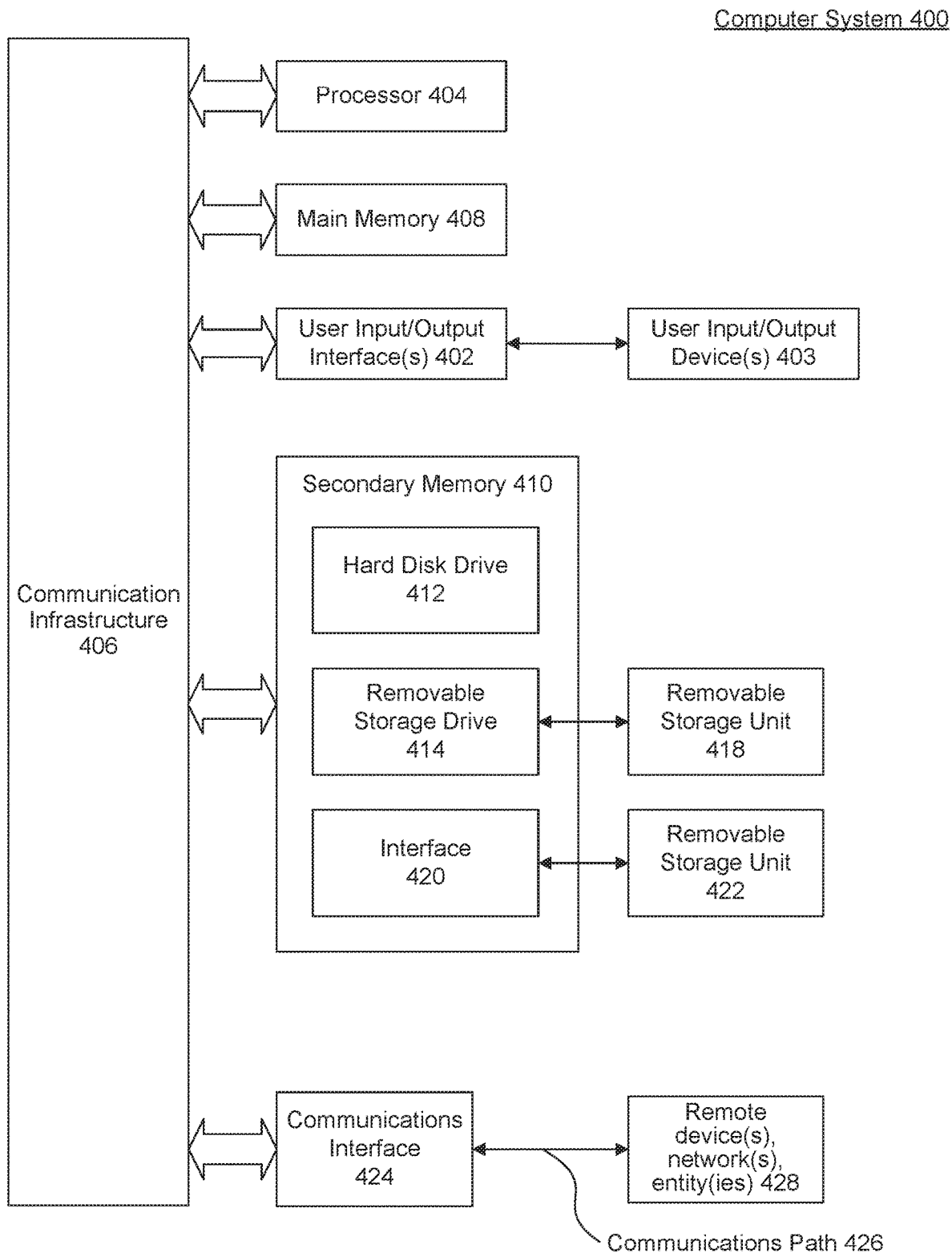
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method of providing non-disruptive explicit feedback service, the computer-implemented method comprising:

determining a trigger corresponding to a feedback event, wherein the trigger is associated with one or more interactions by a user with a particular application and is registered and associated with a feedback application associated with the feedback event;

detecting an application event corresponding to the trigger occurs during an execution of the particular application;

in response to a processor determining that the feedback event corresponds to the application event using the registered trigger, capturing and storing a screenshot of a user interface of the particular application at a time of the detecting, wherein the screenshot include metadata associated with a time a date and a state of the articular application;

providing a notification to the user indicating that feedback corresponding to the application event is requested from the user, wherein the notification is displayed on a selection interface displaying a list of one or more outstanding feedback events;

receiving a request to launch the outstanding feedback event, wherein the user selects one or more outstanding feedback events from the selection interface and the feedback backend receives a request to display a feedback input interface on the user device comprising at least:
information or data of the outstanding feedback event, the screenshot of the of the user interface of the particular application at the time of the detecting, and
a response form;

executing the feedback application;

providing the feedback input interface to the user as part of the feedback event requesting the information from the user; and receiving feedback from the user corresponding to the feedback event via feedback application.

2. The method of claim 1, wherein the detecting comprises:
detecting a first feedback event, wherein the feedback corresponds to the first feedback event; and
detecting a second feedback event prior to the receiving feedback.

3. The method of claim 2, wherein the receiving the request comprises:
providing an interface include both the first feedback event and the second event; and
receiving a selection of the first feedback event.

4. The method of claim 1, wherein the detecting comprises:
determining that the application event corresponds to the trigger;
providing the application event to the particular application;
providing the notification that the application event has occurred to the feedback application; and
providing the screenshot the feedback application.

5. The method of claim 1, wherein the receiving the request comprises:
receiving a user request to end a current session of the particular application; and
displaying the screenshot as part of the feedback event responsive to the user request to end the current session of the particular application.

6. The method of claim 1, wherein the receiving the request comprises:
receiving a user initiated request to launch the feedback event.

7. The method of claim 1, wherein the feedback event is assigned a number of points that decreases as an expiration time gets closer.

8. The method of claim 1, further comprising:
providing a notification that feedback is requested in response to the detecting the trigger, wherein the request to launch the feedback event comprises a selection of the notification.

9. A system for providing non-disruptive explicit feedback service, the system comprising:
a memory; and
at least one processor coupled to the memory and configured to:
determine a trigger corresponding to a feedback event, wherein the trigger is associated with one or more interactions by a user with a particular application and is registered and associated with a feedback application associated with the feedback event;

detect an application event corresponding to the trigger occurs during an execution of the particular application;

in response to the at least one processor determining that the feedback event corresponds to the application event using the registered trigger, capturing and storing a screenshot of a user interface of the particular application at a time of the detecting, wherein the screenshot include metadata associated with a time, a date and a state of the particular application;

provide a notification to the user indicating that feedback corresponding to the application event is requested from the user, wherein the notification is displayed on a selection interface displaying a list of one or more outstanding feedback events;

receive a request to launch the outstanding feedback event, wherein the feedback event requests information from the user, wherein the user selects one or more outstanding feedback events from the selection interface and the feedback backend receives a request to display a feedback input interface on the user device comprising at least:
information or data of the outstanding feedback event, the screenshot of the of the user interface of the particular application at the time of the detecting, and
a response form;

execute the feedback application;

provide the feedback input interface to the user as part of the feedback event requesting the information from the user; and receive feedback from the user corresponding to the feedback event via the feedback application.

10. The system of claim 9, wherein the processor that detects is configured to:
detect a first feedback event, wherein the feedback corresponds to the first feedback event; and
detect a second feedback event prior to the receiving feedback.

11. The system of claim 10, wherein the processor that receives the request is configured to:
provide an interface include both the first feedback event and the second event; and
receive a selection of the first feedback event.

12. The system of claim 9, wherein the processor that detects is configured to:
determine that the application event corresponds to the trigger;
provide the application event to the particular application;
provide the notification that the application event has occurred to the feedback application; and
provide the screenshot the feedback application.

13. A non transitory computer-readable medium having instructions stored thereon that, when executed by at least one computing medium, cause the at least one computing medium to perform operations of providing non-disruptive explicit feedback service, the operations comprising:
determining a trigger corresponding to a feedback event, wherein the trigger is associated with one or more interactions by a user with a particular application and is registered and associated with a feedback application associated with the feedback event;

detecting an application event corresponding to the trigger occurs during an execution of the particular application;

in response to a processor determining that the feedback event corresponds to the application event using the registered trigger, capturing and storing a screenshot of a user interface of the particular application at a time of the detecting wherein the screenshot include metadata associated with a time, a date and a state of the particular application;

providing a notification to the user indicating that feedback corresponding to the application event is requested from the user, wherein the notification is displayed on a selection interface displaying a list of one or more outstanding feedback events;

receiving a request to launch the outstanding feedback event, wherein the feedback event requests information from the user, wherein the user selects one or more outstanding feedback events from the selection interface and the feedback backend receives a request to display a feedback input interface on the user device comprising at least:

information or data of the outstanding feedback event, the screenshot of the of the user interface of the particular application at the time of the detecting, and a response form;

executing the feedback application;

providing the feedback input interface to the user as part of the feedback event requesting the information from the user; and receiving feedback from the user corresponding to the feedback event via the feedback application.

14. The non-transitory computer-readable device of claim 13, wherein the detecting comprises:

detecting a first feedback event, wherein the feedback corresponds to the first feedback event; and detecting a second feedback event prior to the receiving feedback.

\* \* \* \* \*